United States Patent
Kimura

[11] 4,080,048
[45] Mar. 21, 1978

[54] ULTRA-HIGH RESOLUTION REDUCING LENS SYSTEM

[75] Inventor: Tadashi Kimura, Tokyo, Japan

[73] Assignee: Olympus Optical Co., Ltd., Tokyo, Japan

[21] Appl. No.: 731,817

[22] Filed: Oct. 12, 1976

[30] Foreign Application Priority Data

Oct. 14, 1975 Japan .................................. 50-122928

[51] Int. Cl.² ...................... G02B 11/34; G02B 11/32; G02B 21/02
[52] U.S. Cl. .............................. 350/214; 350/175 ML; 350/215
[58] Field of Search ................. 350/215, 175 ML, 214

[56] References Cited

U.S. PATENT DOCUMENTS

| | | | |
|---|---|---|---|
| 3,450,463 | 6/1969 | Yasuda | 350/215 |
| 3,551,031 | 12/1970 | Grey | 350/175 ML |
| 3,664,728 | 5/1972 | Yuta | 350/215 |
| 3,719,413 | 3/1973 | Lechner | 350/214 |
| 3,759,606 | 9/1973 | VanOrden | 350/214 |
| 3,806,231 | 4/1974 | Taira | 350/175 ML |

*Primary Examiner*—Conrad J. Clark
*Attorney, Agent, or Firm*—Cushman, Darby & Cushman

[57] ABSTRACT

An ultra-high resolution reducing lens system comprising a lens group I having negative refractive power and a lens group II having positive refractive power which are arranged by providing a large airspace between them. The ultra-high resolution lens system is compactly designed but has a long working distance. Moreover, the quantity of light does not decrease in the marginal portion of the field, resolution is high, aperture ratio is F1.0 and magnification is ×1/100.

6 Claims, 20 Drawing Figures

FIG. 5A
SPHERICAL ABERRATION

FIG. 5B
ASTIGMATISM

FIG. 5C
DISTORTION

FIG. 5D
COMA

FIG. 6A
SPHERICAL ABERRATION

FIG. 6B
ASTIGMATISM

FIG. 6C
DISTORTION

FIG. 6D
COMA

FIG. 7A
SPHERICAL ABERRATION

FIG. 7B
ASTIGMATISM

FIG. 7C
DISTORTION

FIG. 7D
COMA

FIG. 8A
SPHERICAL ABERRATION

FIG. 8B
ASTIGMATISM

FIG. 8C
DISTORTION

FIG. 8D
COMA

ULTRA-HIGH RESOLUTION REDUCING LENS SYSTEM

BACKGROUND OF THE INVENTION a. Field of the Invention

The present invention relates to an ultra-high resolution reducing lens system and, more particularly, to an ultra-high resolution reducing lens system comprising two lens groups, i.e., a lens group I having negative refractive power and lens group II having positive refractive power, and used for photographing an image of an object on to a film for producing a microfilm.

b. Description of the Prior Art

For known reducing lens systems with magnification about ×1/100, the aperture ratio is generally F1.4 to F1.6 and, therefore, the quantity of light decreases in the marginal portion of the field. Moreover, the working distance (here, the term "working distance" means the distance between the final lens surface of the lens system to the image surface) is short and it is inconvenient for actual use.

Some of known reducing lens systems have larger aperture ratios, i.e., about F1.0. For those lens systems, however, magnification is about ×1/15 and this is unsatisfactory for making a microfilm.

When it is attempted to design a reducing lens system for which the aperture ratio is about F1.0 and still magnification is about ×1/100, the number of lenses constituting the lens system becomes large and the lens system as a whole becomes necessarily large. Moreover, it is very difficult to make the working distance large. Especially, in such case, the quantity of light and resolution in the marginal portion decrease considerably. To prevent such decrease, it is essential to make symmetry of coma favourable. When, however, coma is corrected favourably, it becomes difficult to correct chromatic aberration favourably. So, it is very difficult to favourably correct both of coma and chromatic aberration at the same time.

SUMMARY OF THE INVENTION

It is, therefore, a primary object of the present invention to provide an ultra-high resolution reducing lens system for which magnification is about ×1/100, aperture ratio is large, i.e., about F1.0, resolution is high, lens system as a whole is small and compact and, moreover, working distance is long.

The reducing lens system according to the present invention comprises a lens group I arranged on the object side and having negative refractive power and a lens group II arranged on the image side and having positive refractive power. The lens group I and lens group II are spaced with a large airspace. The lens group I comprises a first lens component $L_1$, which is a positive lens, and a second lens component $L_2$ which comprises one or two negative meniscus lenses arranged convex toward the object side. The lens group II comprises a third lens component $L_3$, fourth lens component $L_4$, fifth lens component $L_5$ and sixth lens component $L_6$. The third lens component $L_3$ is a cemented positive doublet consisting of a biconvex lens and negative lens, the fourth lens component $L_4$ is a positive lens, the fifth lens component $L_5$ is a cemented positive doublet consisting of a negative meniscus lens and positive meniscus lens, and the sixth lens component $L_6$ is a negative meniscus lens which is concave toward the image side. Besides, the reducing lens system according to the present invention satisfies the following conditions when reference symbol $f$ represents the focal length of the lens system as a whole, reference symbol $f_I$ represents the total focal length of the lens group I, reference symbol $f_{II}$ represents the total focal length of the lens group II, reference symbols $r_A$ and $r_B$ respectively represent radii of curvature of lens surface on the object side and image side of the sixth lens component $L_6$ which is arranged closest to the image in the lens group II, and reference symbols $n_A$ and $n_B$ respectively represent refractive indices of the biconvex lens and negative lens constituting the third lens component $L_3$, which is the cemented doublet arranged on the object side in the lens group II.

(1) $1.1f < r_A < 1.5f$
(2) $0.7f < r_B < 1.0f$
(3) $-0.5 < f_{II}/f_I < -0.1$
(4) $-0.3 < n_A - n_B < 0.25$

The reducing lens systems according to the present invention having the above-mentioned lens configuration is designed based on the following idea. That is, though the working distance for known reducing lens systems of ×1/100 was short, the reducing lens system as a whole according to the present invention is arranged as a retrofocus-type lens system by giving negative refractive power to the lens group I and by arranging so that the function for obtaining magnification of the lens system as a whole mostly owes to the lens group II. Thus, the working distance is made long. Moreover, the lens system as a whole is arranged compactly though the aperture ratio is about F1.0.

When the aperture ratio is increased to about F1.0 as in the case of the lens system according to the present invention, the quantity of light and resolution in the marginal portion generally decrease considerably. This is due to the fact that coma becomes asymmetrical. In the present invention, however, favourable symmetry of coma is obtained, without causing conspicuous aggravation of other aberrations, by establishing the conditions (1) through (3). That is, by the fact that refractive powers of the lens group I and lens group II are balanced by the condition (3), the lens system as a whole is arranged compactly by making the working distance long enough and, moreover, offaxial spherical aberration, coma and astigmatism are corrected favourably. If $f_{II}/f_I$ becomes smaller than the lower limit of the condition (3), spherical aberration will be overcorrected and coma and astigmatism will be undercorrected. If, on the other hand, $f_{II}/f_I$ becomes larger than the upper limit, the working distance becomes insufficient and coma and astigmatism will be overcorrected. As described in the above, by the condition (3), respective aberrations are favourably corrected by keeping them well balanced and, at the same time, the working distance is made sufficiently long and aperture ratio is made large. In that case, correction of coma remains as the most important problem. This problem is solved by the conditions (1) and (2). That is, by the conditions (1) and (2), coma is favourably corrected and favourable symmetry of coma is obtained. Moreover, by the conditions (1) and (2), distortion is corrected and, at the same time, the large aperture ratio of F1.0 is obtained without causing decrease of quantity of light in the marginal portion and by obtaining high resolution over the whole filed including the marginal portion. If $r_A$ and/or $r_B$ in the conditions (1) and (2) becomes smaller than the lower limit, coma and distortion will be overcorrected.

If $r_A$ and/or $r_B$ becomes larger than the upper limit, coma and distortion will be undercorrected.

When symmetry of coma is made favourable by the conditions (1) through (3) as described in the above, it is possible to prevent decrease of quantity of light and resolution in the marginal portion. When, however, symmetry of coma is made favourable as described in the above, chromatic aberration will become unfavourable. The condition (4) is established for the purpose of correcting chromtic aberration favourably. If $n_A - n_B$ becomes smaller than the lower limit of the condition (4), chromatic aberration of spherical aberration will be overcorrected. If $n_A - ]B$ becomes larger than the upper limit, lateral chromatic aberration will be undercorrected.

As explained in the above, the present invention provides a large-aperture high-resolution lens system for which the aperture ratio is F1.0 and magnification is about ×100. In the lens system according to the present invention, it is possible to add a positive meniscus lens $L_3'$, which is concave toward the object side, on the object side of the third lens component $L_3$ as a part of the lens group II. Then, by making the added positive meniscus lens $L_3'$ share a part of refractive power of the lens group II, it is possible to correct aberrations more favourably by keeping those aberrations well balanced. Especially it is possible to favourably correct coma in the most marginal portion of the field.

To attain compactness of the lens system and long working distance, it is preferable to arrange so that the airspace D between the lens group I and lens group II satisfies the condition $3.5f < D < 6.0f$.

DETAILED DESCRIPTION OF THE PREFERRED EMBODIMENTS

Preferred embodiments of the reducing lens system according to the present invention explained in the above are as shown below.

Embodiment 1
$f = 1.0$  $\beta = -0.01$  F/1.0
$r_1 = 32.351$
$d_1 = 0.265$  $n_1 = 1.56873$  $\nu_1 = 63.16$
$r_2 = -6.734$
$d_2 = 0.096$
$r_3 = 4.114$
$d_3 = 0.235$  $n_2 = 1.51742$  $\nu_2 = 52.29$
$r_4 = 1.230$
$d_4 = 5.361$
$r_5 = 3.362$
$d_5 = 0.867$  $n_3 = 1.51633$  $\nu_3 = 64.15$
$r_6 = -2.197$
$d_6 = 0.096$  $n_4 = 1.80518$  $\nu_4 = 25.43$
$r_7 = -3.988$
$d_7 = 0.132$
$r_8 = 2.493$
$d_8 = 0.389$  $n_5 = 1.56873$  $\nu_5 = 63.16$
$r_9 = 21.991$
$d_9 = 0.015$
$r_{10} = 1.720$
$d_{10} = 0.188$  $n_6 = 1.80518$  $\nu_6 = 25.43$
$r_{11} = 0.848$
$d_{11} = 0.740$  $n_7 = 1.66680$  $\nu_7 = 33.04$
$r_{12} = 2.561$
$d_{12} = 0.015$
$r_{13} = 1.222$
$d_{13} = 0.540$  $n_8 = 1.75520$  $\nu_8 = 27.51$
$r_{14} = 0.818$
object distance = 97.238  image distance = 0.924
$f_I = -5.731$  $f_{II} = 1.554$ Embodiment 2
$f = 1.0$  $\beta = -0.01$  F/1.0
$r_1 = -13.168$
$d_1 = 0.289$  $n_1 = 1.72000$  $\nu_1 = 50.25$
$r_2 = -5.556$
$d_2 = 0.036$
$r_3 = 1.422$
$d_3 = 0.170$  $n_2 = 1.51742$  $\nu_2 = 52.29$
$r_4 = 1.189$
$d_4 = 0.647$
$r_5 = 2.686$
$d_5 = 0.215$  $n_3 = 1.51633$  $\nu_2 = 64.15$
$r_6 = 1.480$
$d_6 = 4.940$
$r_7 = -40.089$
$d_7 = 0.838$  $n_4 = 1.51633$  $\nu_4 = 64.15$
$r_8 = -1.340$
$d_8 = 0.126$  $n_5 = 1.80518$  $\nu_5 = 25.43$
$r_9 = 2.542$
$d_9 = 0.104$
$r_{10} = 2.191$
$d_{10} = 0.370$  $n_6 = 1.65160$  $\nu_6 = 58.67$
$r_{11} = -13.790$
$d_{11} = 0.014$
$r_{12} = 1.503$
$d_{12} = 0.156$  $n_7 = 1.80518$  $\nu_7 = 25.43$
$r_{13} = 1.201$
$d_{13} = 0.605$  $n_8 = 1.65830$  $\nu_8 = 57.33$
$r_{14} = 2.731$
$d_{14} = 0.014$
$r_{15} = 1.214$
$d_{15} = 0.437$  $n_9 = 1.74950$  $\nu_9 = 35.19$
$r_{16} = 0.749$
object distance = 95.704  image distance = 0.910
$f_I = -9.006$  $f_{II} = 1.326$ Embodiment 3
$f = 1$  $\beta = -0.01$  F/1.0
$r_1 = 55.016$
$d_1 = 0.286$  $n_1 = 1.72151$  $\nu_1 = 29.24$
$r_2 = -6.132$
$d_2 = 0.066$
$r_3 = 4.244$
$d_3 = 0.198$  $n_2 = 1.51633$  $\nu_2 = 64.15$
$r_4 = 1.082$
$d_4 = 4.873$
$r_5 = -3.728$
$d_5 = 0.349$  $n_3 = 1.63854$  $\nu_3 = 55.38$
$r_6 = -1.990$
$d_6 = 0.193$
$r_7 = 2.203$
$d_7 = 0.848$  $n_4 = 1.51633$  $\nu_4 = 64.15$
$r_8 = 1.151$
$d_8 = 0.078$  $n_5 = 1.80518$  $\nu_5 = 25.43$
$r_9 = 7.315$
$d_9 = 0.102$
$r_{10} = 2.189$
$d_{10} = 0.421$  $n_6 = 1.72151$  $\nu_6 = 29.24$
$r_{11} = 7.598$
$d_{11} = 0.015$
$r_{12} = 1.555$
$d_{12} = 0.185$  $n_7 = 1.80518$  $\nu_7 = 25.43$
$r_{13} = 0.849$
$d_{13} = 0.678$  $n_8 = 1.66680$  $\nu_8 = 33.04$
$r_{14} = 2.906$
$d_{14} = 0.015$
$r_{15} = 1.353$
$d_{15} = 0.430$  $n_9 = 1.74950$  $\nu_9 = 35.19$
$r_{16} = 0.905$
object distance = 97.594  image distance = 0.927
$f_I = -4.861$  $f_{II} = 1.596$ Embodiment 4
$f = 1$  $\beta = -0.01$  F/1.0
$r_1 = 7.249$
$d_1 = 0.270$  $n_1 = 1.72151$  $\nu_1 = 29.24$
$r_2 = -26.950$
$d_2 = 0.014$
$r_3 = 1.796$
$d_3 = 0.191$  $n_2 = 1.51633$  $\nu_2 = 64.15$
$r_4 = 1.222$
$d_4 = 0.681$ -continued

| | | |
|---|---|---|
| $r_5 = 3.288$ | | |
| $d_5 = 0.219$ | $n_3 = 1.51633$ | $\nu_3 = 64.15$ |
| $r_6 = 1.205$ | | |
| $d_6 = 3.935$ | | |
| $r_7 = -8.568$ | | |
| $d_7 = 0.459$ | $n_4 = 1.63854$ | $\nu_4 = 55.38$ |
| $r_8 = -2.256$ | | |
| $d_8 = 0.239$ | | |
| $r_9 = 5.154$ | | |
| $d_9 = 0.846$ | $n_5 = 1.51633$ | $\nu_5 = 64.15$ |
| $r_{10} = -1.687$ | | |
| $d_{10} = 0.140$ | $n_6 = 1.80518$ | $\nu_6 = 25.43$ |
| $r_{11} = 66.631$ | | |
| $d_{11} = 0.136$ | | |
| $r_{12} = 2.022$ | | |
| $d_{12} = 0.414$ | $n_7 = 1.72342$ | $\nu_7 = 37.95$ |
| $r_{13} = -63.263$ | | |
| $d_{13} = 0.016$ | | |
| $r_{14} = 1.622$ | | |
| $d_{14} = 0.158$ | $n_8 = 1.80518$ | $\nu_8 = 25.43$ |
| $r_{15} = 0.783$ | | |
| $d_{15} = 0.652$ | $n_9 = 1.66680$ | $\nu_9 = 33.04$ |
| $r_{16} = 3.491$ | | |
| $d_{16} = 0.016$ | | |
| $r_{17} = 1.326$ | | |
| $d_{17} = 0.420$ | $n_{10} = 1.74950$ | $\nu_{10} = 35.19$ |
| $r_{18} = 0.833$ | | |
| object distance = 96.646 | | image distance = 0.932 |
| $f_I = -4.45$ | | $f_{II} = 1.499$ |

Wherein, reference symbols $r_1, r_2 \ldots$ respectively represent radii of curvature of respective lens surfaces, reference symbols $d_1, d_2 \ldots$ respectively represent thicknesses of respective lenses and airspaces between respective lenses, reference symbols $n_1, n_2 \ldots$ respectively represent refractive indices of respective lenses, reference symbols $\nu_1, \nu_2, \ldots$ respectively represent Abbe's numbers of respective lenses, and reference symbol $\beta$ represents magnification.

Figure 1:
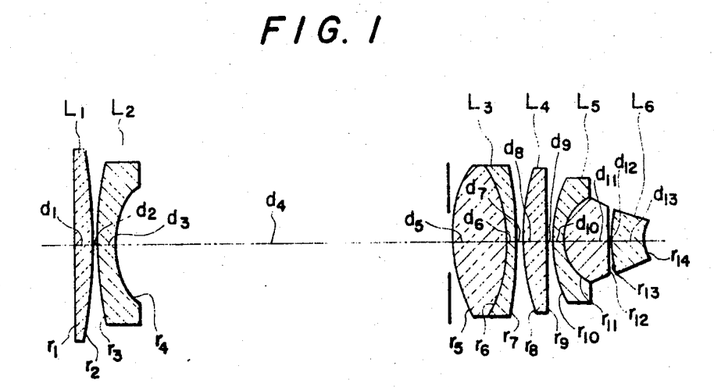
FIG. 1 shows a sectional view of Embodiment 1 of the lens system according to the present invention.
Figure 2:
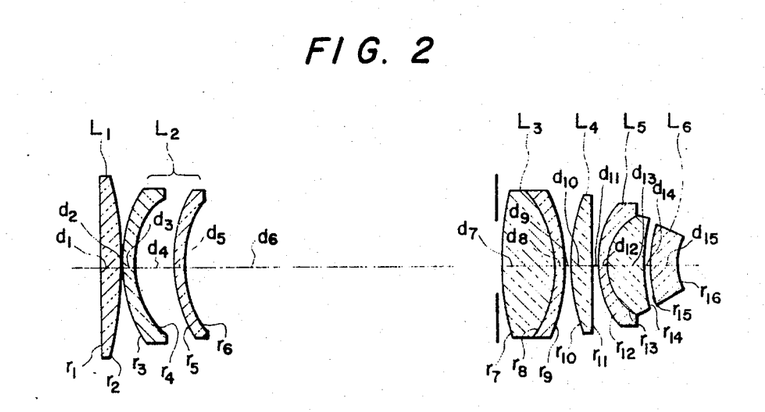
FIG. 2 shows a sectional view of Embodiment 2.
Figure 3:
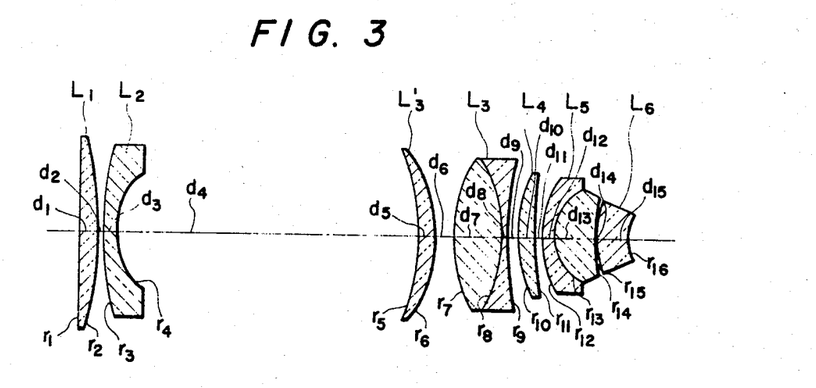
FIG. 3 shows a sectional view of Embodiment 3.
Figure 4:
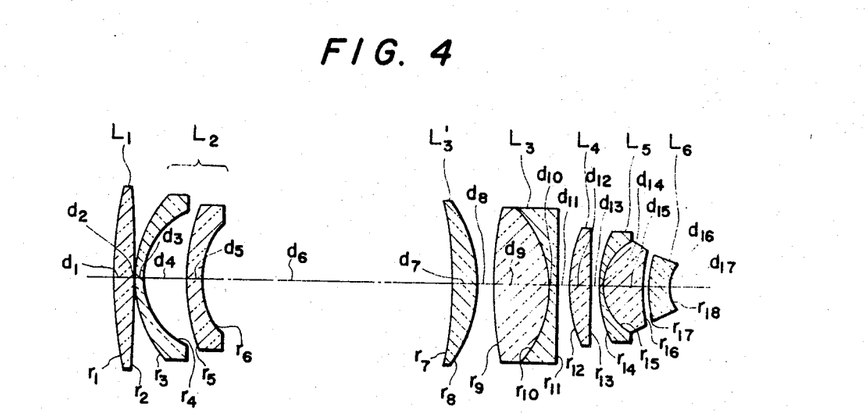
FIG. 4 shows a sectional view of Embodiment 4.
Figure 5A:
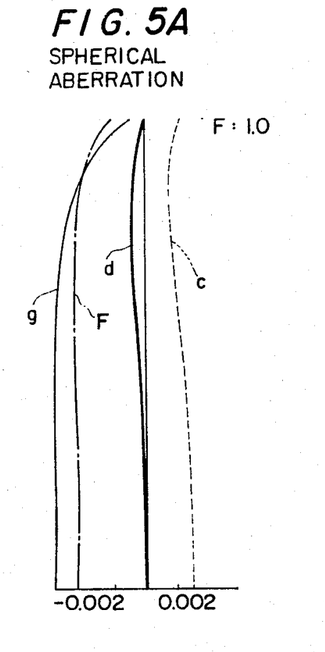
FIGS. 5A, 5B, 5C and 5D respectively show graphs illustrating aberration curves of Embodiment 1.
Figure 5B:
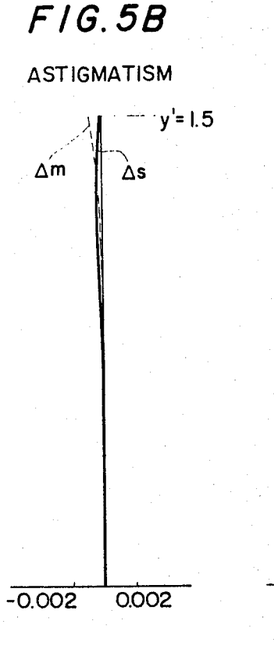
Figure 5C:
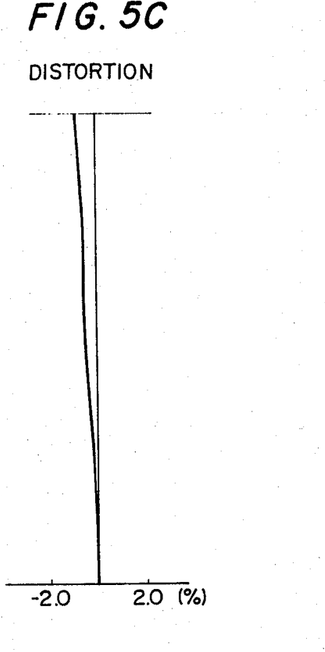
Figure 5D:
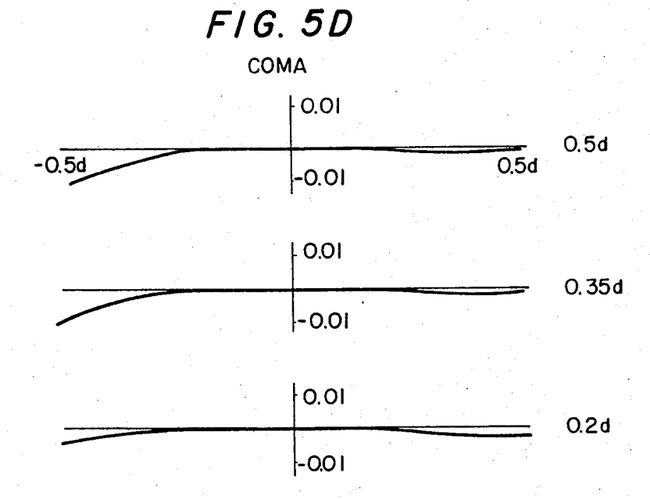
Figure 6A:
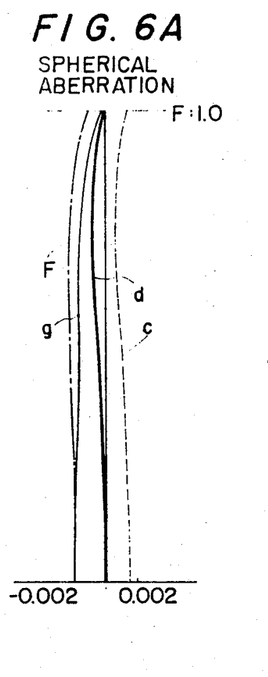
FIGS. 6A, 6B, 6C and 6D respectively show graphs illustrating aberration curves of Embodiment 2.
Figure 6B:
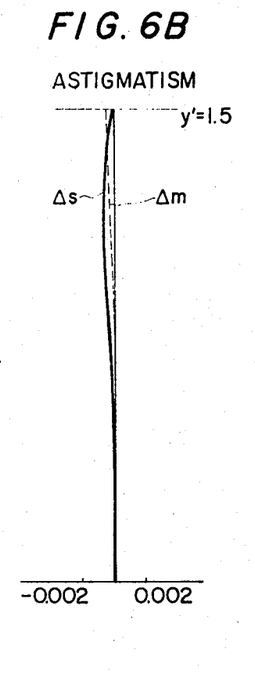
Figure 6C:
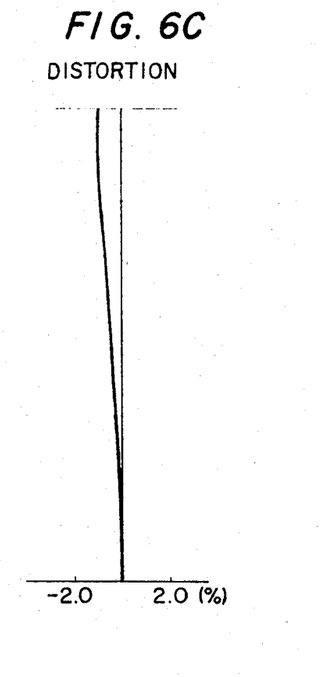
Figure 6D:
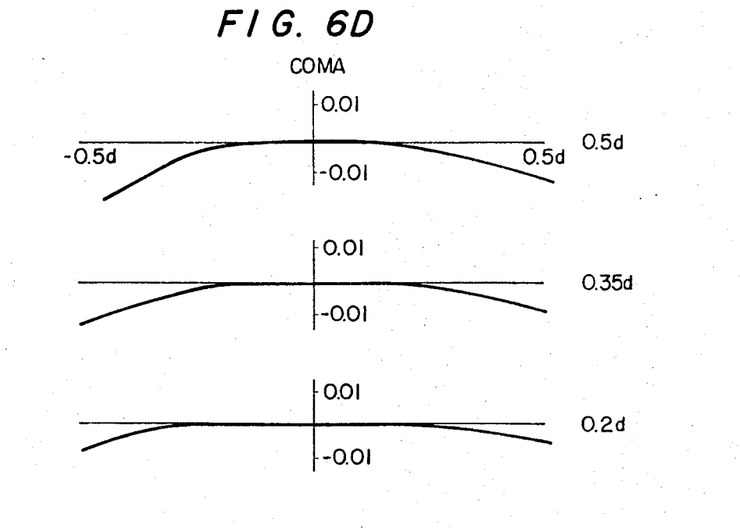
Figure 7A:
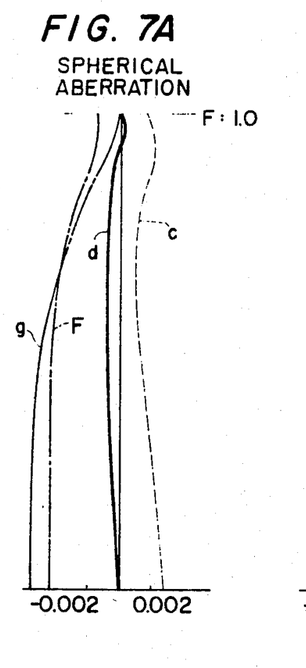
FIGS. 7A, 7B, 7C and 7D respectively show graphs illustrating aberration curves of Embodiment 3.
Figure 7B:
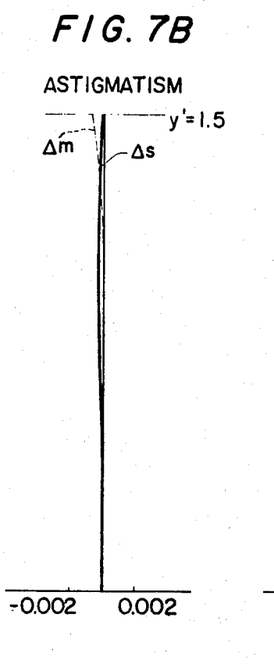
Figure 7C:
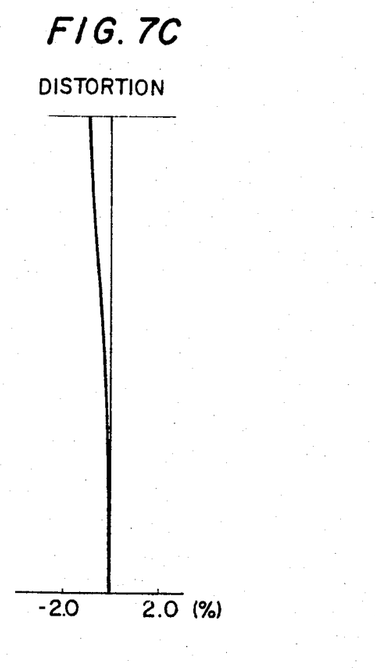
Figure 7D:
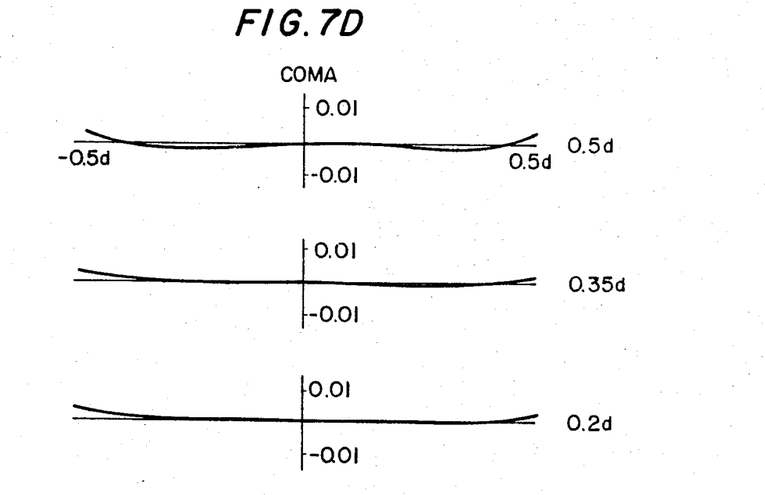
Figure 8A:
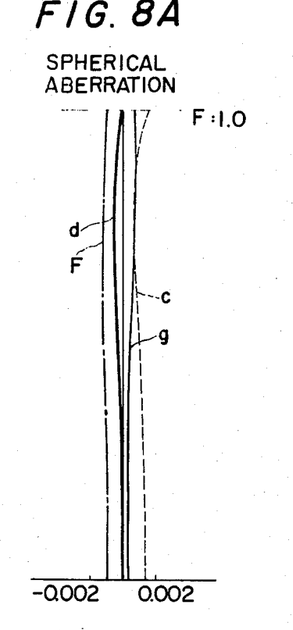
FIGS. 8A, 8B, 8C and 8D respectively show graphs illustrating aberration curves of Embodiment 4.
Figure 8B:
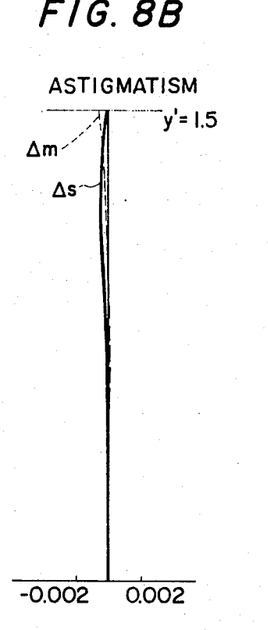
Figure 8C:
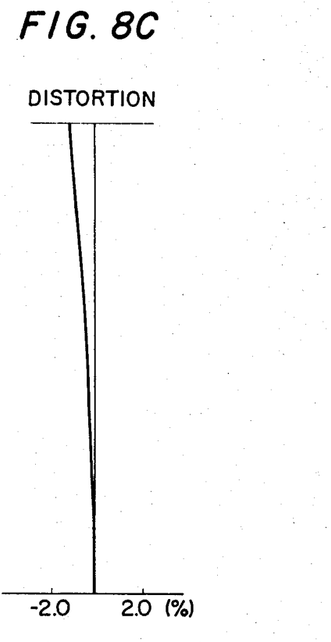
Figure 8D:
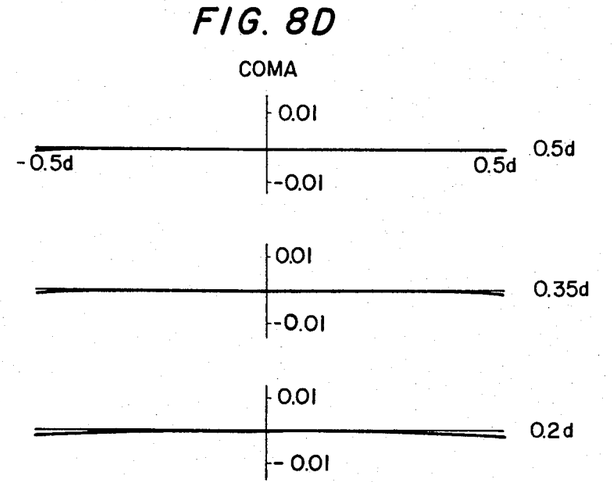

For Embodiment 1 out of the above embodiments, lens configuration is as shown in FIG. 1, i.e., the second lens component $L_2$ in the lens group I consists of a negative meniscus lens, $r_A$ and $r_B$ are respectively $r_{13}$ and $r_{14}$, and $n_A$ and $n_B$ are respectively $n_3$ and $n_4$. For Embodiment 2, the second lens component $L_2$ consists of two negative meniscus lenses as shown in FIG. 2, $r_A$ and $r_B$ are respectively $r_{15}$ and $r_{16}$, and $n_A$ and $n_B$ are respectively $n_4$ and $n_5$. In Embodiments 3 and 4, the positive meniscus lens $L_3'$ which is concave toward the object side is added to the lens group II. For Embodiment 3 out of them, the second lens component $L_2$ consists of a positive meniscus lens as shown in FIG. 3. Therefore, $r_A$ and $r_B$ are $r_{15}$ and $r_{16}$ respectively, and $n_A$ and $n_B$ are $n_4$ and $n_5$ respectively. For Embodiment 4, the second lens component $L_2$ consists of two negative meniscus lenses as shown in FIG. 4. Therefore, $r_A$ and $r_B$ are $r_{17}$ and $r_{18}$ respectively, and $n_A$ and $n_B$ are $n_5$ and $n_6$ respectively.

I claim:

1. An ultra-high resolution reducing lens system comprising a lens group I and lens group II arranged by providing a large airspace between said lens groups I and II, said lens group I comprising a first lens component and second lens component, said first lens component being a positive lens, said second lens component comprising at least one negative meniscus lens convex toward the object side, said lens group II comprising a third lens component, fourth lens component, fifth lens component and sixth lens component, said third lens component being a cemented positive doublet consisting of a biconvex lens and negative meniscus lens, said fourth lens component being a positive lens, said fifth lens component being a cemented positive doublet consisting of a negative meniscus lens and positive meniscus lens, said sixth lens component being a negative meniscus lens concave toward the image side, said ultra-high resolution reducing lens system satisfying the following conditions:

(1) $1.1 f < r_A < 1.5 f$
(2) $0.7 f < r_B < 1.0 f$
(3) $-0.5 < f_{II}/f_I < -0.1$
(4) $-0.3 < n_A - n_B < 0.25$ wherein reference symbol $f$ represents the focal length of the lens system as a whole, reference symbol $f_I$ represents the total focal length of the lens group I, reference symbol $f_{II}$ represents the total focal length of the lens group II, reference symbols $r_A$ and $r_B$ respectively represent radii of curvature of lens surfaces on the object side and image side of the sixth lens component arranged closest to the image side in the lens group II, and reference symbols $n_A$ and $n_B$ respectively represent refractive indices of the biconvex lens and negative lens constituting the third lens component $L_3$.

2. An ultra-high resolution reducing lens system according to claim 1, in which said second lens component consists of a negative meniscus lens, said ultra-high resolution reducing lens system having numerical values as given below:

| $f = 1.0$ | $\beta = -0.01$ | F/1.0 |
|---|---|---|
| $r_1 = 32.351$ | | |
| $d_1 = 0.265$ | $n_1 = 1.56873$ | $\nu_1 = 63.16$ |
| $r_2 = -6.734$ | | |
| $d_2 = 0.096$ | | |
| $r_3 = 4.114$ | | |
| $d_3 = 0.235$ | $n_2 = 1.51742$ | $\nu_2 = 52.29$ |
| $r_4 = 1.230$ | | |
| $d_4 = 5.361$ | | |
| $r_5 = 3.362$ | | |
| $d_5 = 0.867$ | $n_3 = 1.51633$ | $\nu_3 = 64.15$ |
| $r_6 = -2.197$ | | |
| $d_6 = 0.096$ | $n_4 = 1.80518$ | $\nu_4 = 25.43$ |
| $r_7 = -3.988$ | | |
| $d_7 = 0.132$ | | |
| $r_8 = 2.493$ | | |
| $d_8 = 0.389$ | $n_5 = 1.56873$ | $\nu_5 = 63.16$ |
| $r_9 = 21.991$ | | |
| $d_9 = 0.015$ | | |
| $r_{10} = 1.720$ | | |
| $d_{10} = 0.188$ | $n_6 = 1.80518$ | $\nu_6 = 25.43$ |
| $r_{11} = 0.848$ | | |
| $d_{11} = 0.740$ | $n_7 = 1.66680$ | $\nu_7 = 33.04$ |
| $r_{12} = 2.561$ | | |
| $d_{12} = 0.015$ | | |
| $r_{13} = 1.222$ | | |
| $d_{13} = 0.540$ | $n_8 = 1.75520$ | $\nu_8 = 27.51$ |
| $r_{14} = 0.818$ | | |
| object distance = 97.238 | | image distance = 0.924 |
| $f_I = 5.731$ | | $f_{II} = 1.554$ |

Wherein, reference symbols $r_1, r_2 \ldots$ respectively represent radii of curvature of respective lens surfaces, reference symbols $d_1, d_2 \ldots$ respectively represent thicknesses of respective lenses and airspaces between respective lenses, reference symbols $n_1, n_2 \ldots$ respectively represent refractive indices of respective lenses, reference symbols $\nu_1, \nu_2 \ldots$ respectively represent Abbe's numbers of respective lenses, and reference symbol $\beta$ represents magnification.

3. An ultra-high resolution reducing lens system according to claim 1, in which said second lens component consists of two negative meniscus lenses, said ultra-high resolution reducing lens system having numerical value as given below:

| $f = 1.0$ | $\beta = -0.01$ | F/1.0 |
|---|---|---|
| $r_1 = -13.168$ | | |
| $d_1 = 0.289$ | $n_1 = 1.72000$ | $\nu_1 = 50.25$ |
| $r_2 = -5.556$ | | |
| $d_2 = 0.036$ | | |
| $r_3 = 1.422$ | | |

-continued

| | | |
|---|---|---|
| $d_3 = 0.170$ | $n_2 = 1.51742$ | $\nu_2 = 52.29$ |
| $r_4 = 1.189$ | | |
| $d_4 = 0.647$ | | |
| $r_5 = 2.686$ | | |
| $d_5 = 0.215$ | $n_3 = 1.51633$ | $\nu_3 = 64.15$ |
| $r_6 = 1.480$ | | |
| $d_6 = 4.940$ | | |
| $r_7 = -40.089$ | | |
| $d_7 = 0.838$ | $n_4 = 1.51633$ | $\nu_4 = 64.15$ |
| $r_8 = -1.340$ | | |
| $d_8 = 0.126$ | $n_5 = 1.80518$ | $\nu_5 = 25.43$ |
| $r_9 = -2.542$ | | |
| $d_9 = 0.104$ | | |
| $r_{10} = 2.191$ | | |
| $d_{10} = 0.370$ | $n_6 = 1.65160$ | $\nu_6 = 58.67$ |
| $r_{11} = -13.790$ | | |
| $d_{11} = 0.014$ | | |
| $r_{12} = 1.503$ | | |
| $d_{12} = 0.156$ | $n_7 = 1.80518$ | $\nu_7 = 25.43$ |
| $r_{13} = 1.201$ | | |
| $d_{13} = 0.605$ | $n_8 = 1.65830$ | $\nu_8 = 57.33$ |
| $r_{14} = 2.731$ | | |
| $d_{14} = 0.014$ | | |
| $r_{15} = 1.214$ | | |
| $d_{15} = 0.437$ | $n_9 = 1.74950$ | $\nu_9 = 35.19$ |
| $r_{16} = 0.749$ | | |
| object distance = 95.704 | | image distance = 0.910 |
| $f_I = -9.006$ | | $f_{II} = 1.326$ |

Wherein, reference symbols $r_1, r_2 \ldots$ respectively represent radii of curvature of respective lens surfaces, reference symbols $d_1, d_2 \ldots$ respectively represent thicknesses of respective lenses and airspaces between respective lenses, reference symbols $n_1, n_2 \ldots$ respectively represent refractive indices of respective lenses, reference symbols $\nu_1, \nu_2 \ldots$ respectively represent Abbe's numbers of respective lenses, and reference symbol $\beta$ represents magnification.

4. An ultra-high resolution reducing lens system according to claim 1, in which said lens group II further comprises a positive meniscus lens concave toward the object side and arranged on the object side of said third lens component.

5. An ultra-high resolution reducing lens system according to claim 4, in which said second lens component consists of a negative meniscus lens, said ultra-high resolution reducing lens system having numerical values as given below:

| $f = 1$ | $\beta = -0.01$ | F/1.0 |
|---|---|---|
| $r_1 = 55.016$ | | |
| $d_1 = 0.286$ | $n_1 = 1.72151$ | $\nu_1 = 29.24$ |
| $r_2 = -6.132$ | | |
| $d_2 = 0.066$ | | |
| $r_3 = 4.244$ | | |
| $d_3 = 0.198$ | $n_2 = 1.51633$ | $\nu_2 = 64.15$ |
| $r_4 = 1.082$ | | |
| $d_4 = 4.873$ | | |
| $r_5 = -3.728$ | | |
| $d_5 = 0.349$ | $n_3 = 1.63854$ | $\nu_3 = 55.38$ |
| $r_6 = -1.990$ | | |
| $d_6 = 0.193$ | | |
| $r_7 = 2.203$ | | |
| $d_7 = 0.848$ | $n_4 = 1.51633$ | $\nu_4 = 64.15$ |
| $r_8 = -2.151$ | | |
| $d_8 = 0.078$ | $n_5 = 1.80518$ | $\nu_5 = 25.43$ |
| $r_9 = 7.315$ | | |
| $d_9 = 0.102$ | | |
| $r_{10} = 2.189$ | | |
| $d_{10} = 0.421$ | $n_6 = 1.72151$ | $\nu_6 = 29.24$ |
| $r_{11} = 8.598$ | | |
| $d_{11} = 0.015$ | | |
| $r_{12} = 1.555$ | | |
| $d_{12} = 0.185$ | $n_7 = 1.80518$ | $\nu_7 = 25.43$ |
| $r_{13} = 0.849$ | | |
| $d_{13} = 0.678$ | $n_8 = 1.66680$ | $\nu_8 = 33.04$ |
| $r_{14} = 2.906$ | | |
| $d_{14} = 0.015$ | | |
| $r_{15} = 1.353$ | | |
| $d_{15} = 0.430$ | $n_9 = 1.74950$ | $\nu_9 = 35.19$ |
| $r_{16} = 0.905$ | | |
| object distance = 97.594 | | image distance = 0.927 |
| $f_I = -4.861$ | | $f_{II} = 1.596$ |

Wherein, reference symbols $r_1, r_2 \ldots$ respectively represent radii of curvature of respective lens surfaces, reference symbols $d_1, d_2 \ldots$ respectively represent thicknesses of respective lenses and airspaces between respective lenses, reference symbols $n_1, n_2 \ldots$ respectively represent refractive indices of respective lenses, reference symbols $\nu_1, \nu_2 \ldots$ respectively represent Abbe's numbers of respective lenses, and reference symbol $\beta$ represents magnification.

6. An ultra-high resolution reducing lens system according to claim 4, in which said second lens component consists of two negative meniscus lenses, said ultra-high resolution reducing lens system having numerical values as given below:

| $f = 1$ | $\beta = -0.01$ | F/1.0 |
|---|---|---|
| $r_1 = 7.249$ | | |
| $d_1 = 0.270$ | $n_1 = 1.72151$ | $\nu_1 = 29.24$ |
| $r_2 = -26.950$ | | |
| $d_2 = 0.014$ | | |
| $r_3 = 1.796$ | | |
| $d_3 = 0.191$ | $n_2 = 1.51633$ | $\nu_2 = 64.15$ |
| $r_4 = 1.222$ | | |
| $d_4 = 0.681$ | | |
| $r_5 = 3.288$ | | |
| $d_5 = 0.219$ | $n_3 = 1.51633$ | $\nu_3 = 64.15$ |
| $r_6 = 1.205$ | | |
| $d_6 = 3.935$ | | |
| $r_7 = -8.568$ | | |
| $d_7 = 0.459$ | $n_4 = 1.63854$ | $\nu_4 = 55.38$ |
| $r_8 = -2.256$ | | |
| $d_8 = 0.239$ | | |
| $r_9 = 5.154$ | | |
| $d_9 = 0.846$ | $n_5 = 1.51633$ | $\nu_5 = 64.15$ |
| $r_{10} = -1.687$ | | |
| $d_{10} = 0.140$ | $n_6 = 1.80518$ | $\nu_6 = 25.43$ |
| $r_{11} = 66.631$ | | |
| $d_{11} = 0.136$ | | |
| $r_{12} = 2.022$ | | |
| $d_{12} = 0.414$ | $n_7 = 1.72342$ | $\nu_7 = 37.95$ |
| $r_{13} = -63.263$ | | |
| $d_{13} = 0.016$ | | |
| $r_{14} = 1.622$ | | |
| $d_{14} = 0.158$ | $n_8 = 1.80518$ | $\nu_8 = 25.43$ |
| $r_{15} = 0.783$ | | |
| $d_{15} = 0.652$ | $n_9 = 1.66680$ | $\nu_9 = 33.04$ |
| $r_{16} = 3.491$ | | |
| $d_{16} = 0.016$ | | |
| $r_{17} = 1.326$ | | |
| $d_{17} = 0.420$ | $n_{10} = 1.74950$ | $\nu_{10} = 35.19$ |
| $r_{18} = 0.833$ | | |
| object distance = 96.646 | | image distance = 0.932 |
| $f_I = -4.45$ | | $f_{II} = 1.499$ |

Wherein, reference symbols $r_1, r_2 \ldots$ respectively represent radii of curvature of respective lens surfaces, reference symbols $d_1, d_2 \ldots$ respectively represent thicknesses of respective lenses and airspaces between respective lenses, reference symbols $n_1, n_2 \ldots$ respectively represent refractive indices of respective lenses, reference symbols $\nu_1, \nu_2 \ldots$ respectively represent Abbe's numbers of respective lenses, and reference symbol $\beta$ represents mangification.

* * * * *